United States Patent
Ainsworth et al.

(10) Patent No.: US 8,135,631 B2
(45) Date of Patent: Mar. 13, 2012

(54) SYSTEMS, METHODS, AND SOFTWARE ARRANGEMENTS FOR IMPROVING UNIFORMITY OF ASSETS WITHIN AN ENTITY

(75) Inventors: John Ainsworth, Mount Sinai, NY (US); Ronald J. Cass, Cleveland Heights, OH (US); Allan T. Andersen, Northport, NY (US)

(73) Assignee: Computer Associates Think, Inc., Islandia, NY (US)

(*) Notice: Subject to any disclaimer, the term of this patent is extended or adjusted under 35 U.S.C. 154(b) by 47 days.

(21) Appl. No.: 11/691,028

(22) Filed: Mar. 26, 2007

(65) Prior Publication Data

US 2008/0082350 A1    Apr. 3, 2008

Related U.S. Application Data

(60) Provisional application No. 60/827,942, filed on Oct. 3, 2006.

(51) Int. Cl.
*G06Q 10/00* (2006.01)

(52) U.S. Cl. .......................................................... 705/28

(58) Field of Classification Search ..................... 705/28
See application file for complete search history.

(56) References Cited

U.S. PATENT DOCUMENTS

| 2004/0034577 A1* | 2/2004 | Van Hoose et al. ............. 705/28 |
| 2004/0083150 A1* | 4/2004 | Michaud et al. ................ 705/36 |

* cited by examiner

*Primary Examiner* — Ryan Zeender
*Assistant Examiner* — Fateh Obaid
(74) *Attorney, Agent, or Firm* — Baker Botts L.L.P.

(57) ABSTRACT

A computer-readable medium having computer-readable instructions stored thereon, which, when executed by a computer arrangement, configures the computer arrangement to perform a new plurality of steps. Those steps include retrieving data from a database. The data is associated with a plurality of assets, and the data for each asset includes information associated with the plurality features of the asset. The computer arrangement also groups the plurality of assets into at least one cluster based on the data and determines an associated hypothetical standard metric. A hypothetical standard metric comprises at least one of a Z-score corresponding to a deviation to a norm of the grouping and a curved line fitting. The computer arrangement also determines a degree of difference between each of a plurality of assets in the hypothetical standard metric and removes at least one asset of the plurality of assets to decrease the degree of difference.

18 Claims, 2 Drawing Sheets

SYSTEMS, METHODS, AND SOFTWARE ARRANGEMENTS FOR IMPROVING UNIFORMITY OF ASSETS WITHIN AN ENTITY

CROSS-REFERENCE TO RELATED APPLICATIONS

The present application is a non-provisional patent application which claims priority from and is based on U.S. Provisional Patent Application Ser. No. 60/827,942, the disclosure of which is incorporated herein by reference in its entirety.

BACKGROUND OF THE INVENTION

1. Field of the Invention

The present invention relates generally to systems, methods, and software arrangements for improving uniformity of assets within an entity. In particular, the present invention is directed towards systems, methods, and software arrangements in which variation between assets within an entity is decreased by grouping similar assets into a cluster and changing the features of and/or removing at least some of the assets within the cluster.

2. Description of Related Art

Many entities, e.g., corporations, partnerships, or the like, include an information technology department which manages technological assets, e.g., desktop computers, laptop computers, servers, and the like, of the entity. Generally, as an entity's inventory of assets increases and the assets are used by employees of the entity, differences between various related assets increases. For example, the features of a plurality of related assets initially may be substantially similar. However, as employees of the entity use the assets over the course of time, the features of each of the assets may change, e.g., the configuration of the assets may be altered, such that at least some of the features of the assets no longer may be substantially similar. Moreover, when new assets are added to the inventory, some of the features of the new assets may not be substantially the same as the features of the assets that already are included in the inventory. As the differences between related assets increases, it becomes more difficult, time consuming, and expensive for the information technology department to manage the assets.

SUMMARY OF THE INVENTION

Therefore, a need has arisen for systems, methods, and software arrangements which overcome these and other shortcomings of the related art. A technical advantage of the present invention is an entity's related technological assets may be made more uniform by grouping related assets into a cluster (or a plurality of clusters when appropriate), determining a hypothetical metric standard for the assets included in the cluster, and determining a degree of difference between each of the assets included in the cluster and the hypothetical standard metric. Based on the determined degrees of difference, some of the features of the assets which have the greatest degree of difference may be altered, such that those assets having the greatest degree of difference are made more uniform with respect to the hypothetical metric standard. As such, related technological assets may be made more uniform by selectively changing features of those assets which are most deviant from the hypothetical metric standard.

According to an embodiment of the present invention, a computer-readable medium has computer-readable instructions stored thereon, which, when executed by a computer arrangement, configures the computer arrangement to perform the steps of retrieving data from a database, in which the data is associated with a plurality of assets which are associated with a particular entity, and the data for each asset of the plurality of assets comprises information associated with a plurality of features of the asset, grouping the plurality of assets into at least one cluster of assets based on the data, determining a hypothetical standard metric associated with the plurality of assets, and determining a degree of difference between each of the plurality of assets and the hypothetical standard metric.

According to another embodiment of the present invention, a method for improving uniformity of assets within an entity, comprising the step of retrieving data from a database, in which the data is associated with a plurality of assets which are associated with a particular entity, and the data for each asset of the plurality of assets comprises information associated with a plurality of features of the asset. The method also comprises the steps of grouping the plurality of assets into at least one cluster of assets based on the data, and determining a hypothetical standard metric associated with the plurality of assets. Moreover, the method comprises the step of determining a degree of difference between each of the plurality of assets and the hypothetical standard metric. In a modification of this embodiment of the present invention, the method further comprises the step of selecting at least one asset of the plurality of assets based on the degree of difference between the at least one asset of the plurality of assets and the hypothetical standard metric, and altering at least one feature of the at least one asset of the plurality of assets to decrease the degree of difference between the at least one asset of the plurality of assets and the hypothetical standard metric.

According to yet another embodiment of the present invention, a system for improving uniformity of assets within an entity comprises a database for storing data, in which the data is associated with a plurality of assets which are associated with a particular entity, and the data for each asset of the plurality of assets comprises information associated with a plurality of features of the asset. The system also comprises a processing arrangement for retrieving the data from the database, for grouping the plurality of assets into at least one cluster of assets based on the data, for determining a hypothetical standard metric associated with the plurality of assets, and for determining a degree of difference between each of the plurality of assets and the hypothetical standard metric. In a modification of this embodiment of the present invention, the system further comprises a client-side arrangement for selecting at least one asset of the plurality of assets based on the degree of difference between the at least one asset of the plurality of assets and the hypothetical standard metric, and for altering at least one feature of the at least one asset of the plurality of assets to decrease the degree of difference between the at least one asset of the plurality of assets and the hypothetical standard metric.

Other features and technical advantages of the present invention will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

DETAILED DESCRIPTION OF EMBODIMENTS

Figure 1:
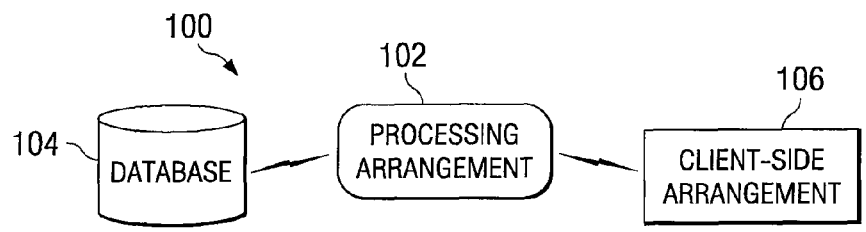
FIG. 1 is a schematic of a system for improving uniformity of assets within an entity, according to an embodiment of the present invention.
Figure 2:
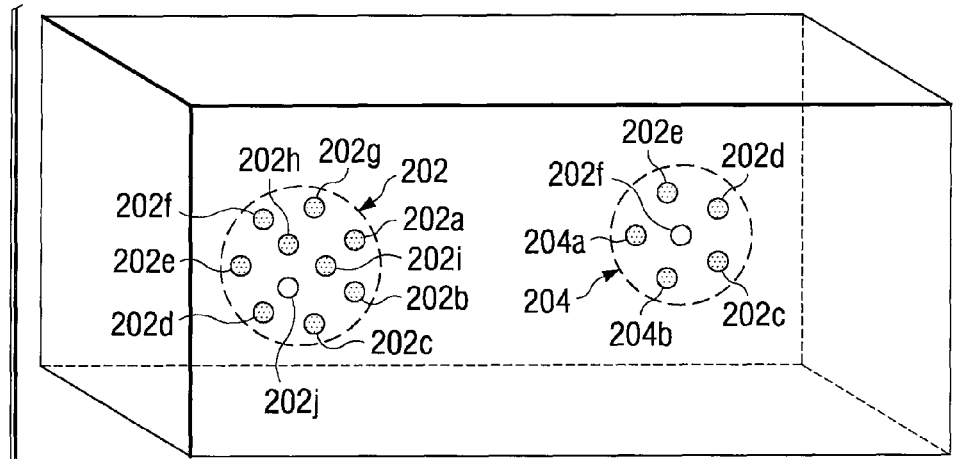
FIG. 2 is an exemplary schematic of two different clusters of assets within an entity, and an exemplary deviation of one of the cluster of assets from the center of the cluster, according to an embodiment of the present invention.
Figure 2:
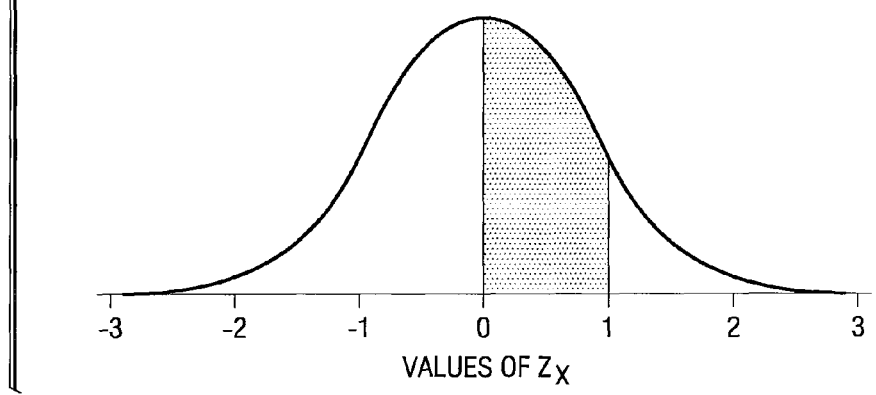
Figure 3:
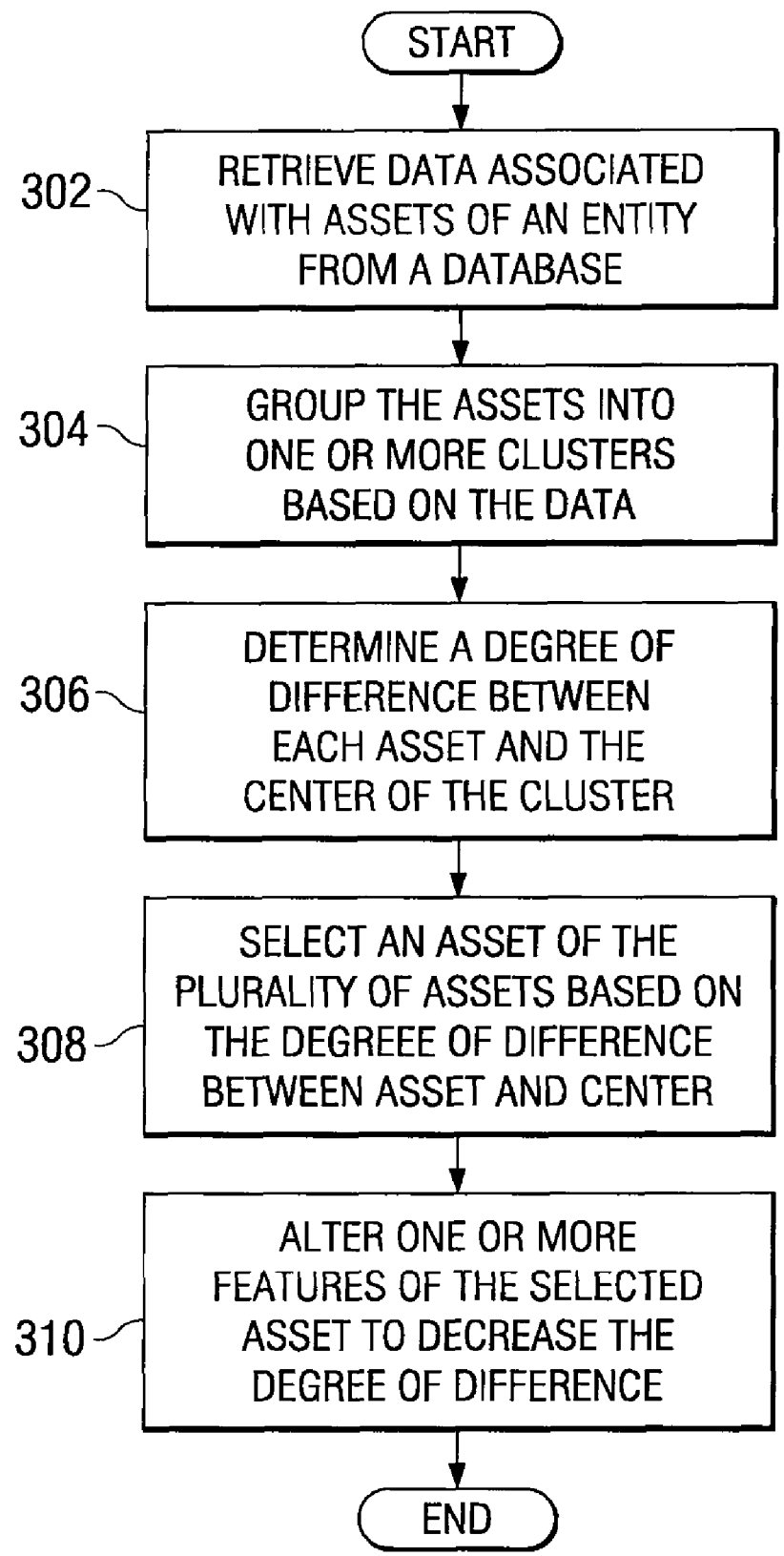
FIG. 3 is a flow chart of a method for improving uniformity of assets within an entity, according to an embodiment of the present invention.

Embodiments of the present invention and their features and technical advantages may be understood by referring to FIGS. 1-3, like numerals being used for like corresponding parts in the various drawings.

Referring to FIG. 1, a system 100 for improving uniformity of assets within an entity, according to an embodiment of the present invention, is depicted. System 100 may comprise a database 104, a processing arrangement 102 coupled to database 104, and a client-side arrangement 106 coupled to processing arrangement 102.

Database 104 may store data associated with a plurality of different assets, e.g., a laptop computer, a desktop computer, a server, or the like, and combinations thereof, of a particular entity, e.g., a corporation, a partnership, or the like, which is a client of an operator of system 100. The data associated with each of the assets may comprise information associated with different features of the asset. For example, such features may be a vendor of the asset, an operating system of the asset, an age of the asset, a speed of the asset, an amount of memory associated with the asset, a number of computer processing units associated with the asset, software installed on the asset, or the like, and combinations thereof.

Referring to FIGS. 1 and 2, processing arrangement 102 may be configured to retrieve the data from database 104, and to group the assets into one or more clusters of assets based on the data associated with the assets. For example, referring to FIG. 2, processing arrangement 102 may group the assets into a first cluster of assets 202 comprising assets 202a-202j, and a second cluster of assets 204 comprising assets 204a-204f. Although FIG. 2 depicts a pair of clusters, those of ordinary skill in the art readily will understand that processing arrangement 102 may group the assets into any number of cluster of assets, and that each cluster of assets may comprise any number of assets. For example, the number of clusters of assets may depend on the number of different types of assets associated with the particular entity, and the degree of similarities and difference between each of the assets within each of the different types of assets. In this embodiment of the present invention, processing arrangement 102 grouped the assets into first cluster of assets 202 and second cluster of assets 204 based on the data associated with the assets. Specifically, although the features of assets 202a-202j are different, the features of assets 202a-202j were similar enough to group them together in first cluster of assets 202, and the features of assets 204a-204f were similar enough to group them together in second cluster of assets 204. Moreover, when each of the assets is plotted within the cluster, the number dimensions of the plot may correspond to the number of features which were considered, e.g., if four features are considered then the plot of the clusters may be a four-dimensional plot. Nevertheless, those of ordinary skill in the art readily will understand that the plot of the assets may plot having an number of dimensions. Each of first cluster of assets 202 and second cluster of assets 204 has a center point which may correspond to a hypothetical standard metric associated with the assets included in the cluster of assets. For example, as shown in FIG. 2, the hypothetical standard metric may correspond to a Z-score which represents a deviation from the norm of the cluster of assets. Alternatively, a curved-line fitting method, such as a linear regression method, may be employed to predict/determine a desired or an ideal hypothetical standard metric for the cluster of assets. In this embodiment of the present invention, because workload-configuration models may change from year to year, and thus, the desired or ideal hypothetical standard metric may change over time, the curved-line fitting model may made to be a time-dependent model by incorporating a time/date related variable into the model. Moreover, processing arrangement 102 may be configured to determine a degree of difference, e.g., a deviation from the hypothetical standard metric, between each of the assets included in the cluster of assets and the hypothetical standard metric.

In operation, client-side arrangement 106, e.g., a processing arrangement associated with the particular entity or an individual or group of individuals associated with the particular entity, may select one or more of the assets of each cluster and to alter one or more of the features of the selected assets. For example, client-side arrangement 106 may select those assets of each cluster which have the greatest degree of difference with respect to the hypothetical standard metric. Client-side arrangement 106 then may alter the features of the selected assets, such that the degree of difference between the selected assets and the hypothetical standard metric decreases, which results in the assets within the cluster being more uniform with respect to each other. Alternatively, if the degree of difference between a selected asset and the hypothetical standard metric is sufficiently large, the selected asset may be removed from the assets associated with the particular entity. Thus, by grouping the assets of the particular entity into clusters of assets, and determining the degree of difference between the assets within the cluster and the hypothetical standard metric, assets of similar types may be made more uniform with respect to each other, which makes it less difficult, time consuming, and expensive for the information technology department to manage the assets.

Referring to FIG. 3, a method for improving uniformity of assets within an entity, according to an embodiment of the present invention is depicted. In step 302, data associated with the assets may be retrieved, e.g., from database 104, and in step 304 the assets may be grouped into one or more clusters based on the data associated the assets. In step 306, the degree of difference between each asset and the hypothetical standard metric may be determined. Moreover, in step 308, one or more assets may be selected based on the degree of difference between the selected asset and the hypothetical standard metric, and in step 310 one or more features of the selected asset may be altered to decrease the degree of difference between the selected asset and the hypothetical standard metric.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:

1. A computer-readable medium having computer-readable instructions stored thereon, which, when executed by a computer arrangement, configures the computer arrangement to perform the steps of:
   retrieving data from a database, wherein the data is associated with a plurality of assets which are associated with a particular entity, and the data for each asset of the plurality of assets comprises information associated with a plurality of features of the asset;
   grouping the plurality of assets into at least one cluster of assets based on the data;
   determining a hypothetical standard metric associated with the plurality of assets within the at least one cluster, the hypothetical standard metric comprising at least one of:
      a Z-score corresponding to a deviation to a norm of the grouping; and
      a curved line fitting;
   determining a degree of difference between each of the plurality of assets and the hypothetical standard metric;
   removing at least one asset of the plurality of assets; and
   altering at least one feature of at least a second asset of the plurality of assets to decrease the degree of difference between the at least a second asset and the hypothetical standard metric.

2. The computer-readable medium of claim 1, wherein a center of the at least one cluster of assets corresponds to the hypothetical standard metric.

3. The computer-readable medium of claim 1, wherein the plurality of assets comprise one of a laptop computer, a desktop computer, and a server, and the plurality of features comprise at least two features selected from the group consisting of a vendor of the asset, an operating system of the asset, an age of the asset, a speed of the asset, an amount of memory associated with the asset, a number of computer processing units associated with the asset, and software installed on the asset.

4. The computer-readable medium of claim 2, wherein the step of grouping comprises the sub-steps of:
   grouping a first portion of the plurality of assets into a first cluster of assets based on the data, wherein a first center of the first cluster of assets corresponds to a first hypothetical standard metric associated with the first portion of the plurality of assets; and
   grouping a second portion of the plurality of assets into a second cluster of assets based on the data, wherein a second center of the second cluster of assets corresponds to a second hypothetical standard metric associated with the second portion of the plurality of assets.

5. The computer-readable medium of claim 4, wherein the step of determining comprises the sub-steps of:
   determining a degree of difference between each of the first portion of the plurality of assets and the first center of the first cluster of assets; and
   determining a degree of difference between each of the second portion of the plurality of assets and the second center of the second cluster of assets.

6. A computer-readable medium having computer-readable instructions stored thereon, which, when executed by a computer arrangement, configures the computer arrangement to perform the steps of:
   retrieving data from a database, wherein the data is associated with a plurality of assets which are associated with a particular entity, and the data for each asset of the plurality of assets comprises information associated with a plurality of features of the asset;
   grouping the plurality of assets into at least one cluster of assets based on the data;
   determining a hypothetical standard metric associated with the plurality of assets, the hypothetical standard metric comprising at least one of:
      a Z-score corresponding to a deviation to a norm of the grouping; and
      a curved line fitting;
   determining a degree of difference between each of the plurality of assets and the hypothetical standard metric; and
   altering at least one feature of at least one asset of the plurality of assets to decrease the degree of difference between the at least one asset and the hypothetical standard metric.

7. The computer-readable medium of claim 6, wherein a center of the at least one cluster of assets corresponds to the hypothetical standard metric.

8. The computer-readable medium of claim 7, further comprising prior to altering the at least one feature, selecting at least one asset of the plurality of assets based on the degree of difference between the at least one asset of the plurality of assets and the center of the at least one cluster of assets.

9. The computer-readable medium of claim 6, wherein the plurality of assets comprise one of a laptop computer, a desktop computer, and a server, and the plurality of features comprise at least two features selected from the group consisting of a vendor of the asset, an operating system of the asset, an age of the asset, a speed of the asset, an amount of memory associated with the asset, a number of computer processing units associated with the assets, and software installed on the asset.

10. The computer-readable medium of claim 7, wherein the step of grouping comprises the sub-steps of:
    grouping a first portion of the plurality of assets into a first cluster of assets based on the data, wherein a first center of the first cluster of assets corresponds to a first hypothetical standard metric associated with the first portion of the plurality of assets; and
    grouping a second portion of the plurality of assets into a second cluster of assets based on the data, wherein a second center of the second cluster of assets corresponds to a second hypothetical standard metric associated with the second portion of the plurality of assets.

11. The computer-readable medium of claim 10, wherein the step of determining comprises the sub-steps of:
    determining a degree of difference between each of the first portion of the plurality of assets and the first center of the first cluster of assets; and
    determining a degree of difference between each of the second portion of the plurality of assets and the second center of the second cluster of assets.

12. A system for improving uniformity of assets within an entity, comprising:
    a database for storing data, wherein the data is associated with a plurality of assets which are associated with a particular entity, and the data for each asset of the plurality of assets comprises information associated with a plurality of features of the asset; and
    a processing arrangement, comprising:
       a computer readable medium; and
       a processor, the processor being operable to execute a program of instructions encoded on the computer readable medium, the program of instructions being operable to:

retrieve the data from the database,
group the plurality of assets into at least one cluster of assets based on the data,
determine a hypothetical standard metric associated with the plurality of assets, the hypothetical standard metric comprising at least one of:
a Z-score corresponding to a deviation to a norm of the grouping; and
a curved line fitting, determine a degree of difference between each of the plurality of assets and the hypothetical standard metric; and
a client-side arrangement for removing at least one asset of the plurality of assets, the client-side arrangement further for altering at least one feature of at least a second asset of the plurality of assets to decrease the degree of difference between the at least a second asset and the hypothetical standard metric.

13. The system of claim 12, wherein a center of the at least one cluster of assets corresponds to the hypothetical standard metric.

14. The system of claim 12, wherein the plurality of assets comprise one of a laptop computer, a desktop computer, and a server, and the plurality of features comprise at least two features selected from the group consisting of a vendor of the asset, an operating system of the asset, an age of the asset, a speed of the asset, an amount of memory associated with the asset, a number of computer processing units associated with the assets, and software installed on the asset.

15. A system for improving uniformity of assets within an entity, comprising:
means for storing data, wherein the data is associated with a plurality of assets which are associated with a particular entity, and the data for each asset of the plurality of assets comprises information associated with a plurality of features of the asset;
means for retrieving the data from the database;
means for grouping the plurality of assets into at least one cluster of assets based on the data;
means for determining a hypothetical standard metric associated with the plurality of assets, the hypothetical standard metric comprising at least one of:
a Z-score corresponding to a deviation to a norm of the grouping; and
a curved line fitting;
means for determining a degree of difference between each of the plurality of assets and the hypothetical standard metric;
means for removing at least one asset of the plurality of assets; and
means for altering at least one feature of at least a second asset of the plurality of assets to decrease the degree of difference between the at least a second asset and the hypothetical standard metric.

16. The system of claim 15, wherein a center of the at least one cluster of assets corresponds to the hypothetical standard metric.

17. The system of claim 15, wherein the plurality of assets comprise one of a laptop computer, a desktop computer, and a server.

18. The system of claim 15, wherein the plurality of features comprise at least two features selected from the group consisting of a vendor of the asset, an operating system of the asset, an age of the asset, a speed of the asset, an amount of memory associated with the asset, a number of computer processing units associated with the assets, and software installed on the asset.

* * * * *